United States Patent
Andreas et al.

(10) Patent No.: US 6,768,937 B2
(45) Date of Patent: Jul. 27, 2004

(54) METHOD AND DEVICE FOR REGULATING A DOCKING PROCESS BETWEEN TWO AUTOMOBILES

(75) Inventors: Peter Andreas, Gifhorn (DE); Thomas Ruchatz, Lehre (DE); Heiko Rabba, Braunschweig (DE); Thomas Bizenberger, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 23 days.

(21) Appl. No.: 10/203,916

(22) PCT Filed: Apr. 2, 2001

(86) PCT No.: PCT/EP01/03711

§ 371 (c)(1),
(2), (4) Date: Aug. 15, 2002

(87) PCT Pub. No.: WO01/85486

PCT Pub. Date: Nov. 15, 2001

(65) Prior Publication Data

US 2003/0014175 A1 Jan. 16, 2003

(30) Foreign Application Priority Data

May 11, 2000 (DE) .......................................... 100 23 067

(51) Int. Cl.$^7$ .............................. G06F 7/00; B60T 7/12
(52) U.S. Cl. ........................... 701/96; 701/93; 180/170; 340/903; 340/435
(58) Field of Search ............................... 701/74–75, 91, 701/96, 93, 70, 79, 94; 342/104, 118, 70, 106, 107, 109, 114; 340/904, 441, 444, 466, 467, 901, 903, 936, 435, 436; 180/179, 271, 282, 167, 168, 169, 170; 123/339.1, 339.14

(56) References Cited

U.S. PATENT DOCUMENTS 5,165,497 A    11/1992   Chi .............................. 180/169

(List continued on next page.)

FOREIGN PATENT DOCUMENTS

| DE | 195 09 178 | 9/1995 |
| DE | 691 23 947 T | 4/1997 |
| DE | 196 24 615 | 1/1998 |
| DE | 196 50 168 | 6/1998 |
| DE | 199 36 586 | 2/2000 |
| EP | 0 846 587 | 6/1998 |

*Primary Examiner*—Jacques H. Louis-Jacques
(74) *Attorney, Agent, or Firm*—Kenyon & Kenyon

(57) ABSTRACT

A method is for regulating the speed of an automobile and the distance of the automobile from at least one automobile driving in front during a docking process, the driving speed of the automobile being greater than that of the automobile in front. According to the method, a detection device with a distance sensor is used to determine at least the speed of the automobile, the relative speed and the distance from the automobile in front, and the value of a normal acceleration for a braking operation of the vehicle is calculated according to the difference between a predetermined normal desired following distance and the distance and the relative speed. The technical problem of further improving the functioning of a method of this type and the corresponding device and ensuring comfortable driving behavior during the docking process between the two automobiles is solved by calculating the value for a limit acceleration for a braking operation of the automobile according to the difference between a predetermined limit desired following distance and the distance and the relative speed, by determining the greater of the two values for the normal acceleration and the limit acceleration in terms of amount, as the braking acceleration to be applied, and braking the automobile with the braking acceleration. A device for performing the method includes two proportionality regulators for calculating the normal acceleration and the limit acceleration.

15 Claims, 1 Drawing Sheet

U.S. PATENT DOCUMENTS

| | | | |
|---|---|---|---|
| 5,173,859 A | * 12/1992 | Deering | 701/70 |
| 5,396,426 A | * 3/1995 | Hibino et al. | 701/96 |
| 6,009,368 A | 12/1999 | Labuhn et al. | 701/96 |
| 6,044,321 A | 3/2000 | Nakamura et al. | 701/96 |
| 6,339,740 B1 | * 1/2002 | Seto et al. | 701/96 |
| 6,401,024 B1 | * 6/2002 | Tange et al. | 701/96 |
| 6,493,625 B2 | * 12/2002 | Andreas et al. | 701/96 |
| 6,496,108 B1 | * 12/2002 | Baker et al. | 340/436 |
| 6,591,180 B1 | * 7/2003 | Steiner | 701/96 |
| 6,618,000 B2 | * 9/2003 | Winner et al. | 701/96 |
| 2003/0130783 A1 | * 7/2003 | Hellmann et al. | 701/93 |

* cited by examiner

METHOD AND DEVICE FOR REGULATING A DOCKING PROCESS BETWEEN TWO AUTOMOBILES

FIELD OF THE INVENTION

The present invention relates to a method and a device for regulating the speed of a motor vehicle and the distance of a motor vehicle from at least one motor vehicle driving ahead during a docking operation, the motor vehicle having a greater driving speed than the preceding motor vehicle.

BACKGROUND INFORMATION

It is conventional from the methods for automatic ranging (ADR) that at least speed v of the vehicle, relative velocity $V_{rel}$ and distance $s_{actual}$ from the preceding vehicle are determined with the help of a detection device having a distance sensor. Moreover, the value of a normal acceleration $a_n$ is calculated for braking of the vehicle as a function of the difference between a predefined standard setpoint trailing distance $s_n$ and distance $s_{actual}$ and of relative velocity $V_{rel}$. The vehicle is then braked at the normal acceleration, which is negative for a deceleration, in order to regulate the vehicle to standard setpoint trailing distance $s_n$.

However, if the relative velocity of the two vehicles is too high, the braking effect exerted by the automatic ranging system is not sufficient to prevent the an insufficient setpoint trailing distance, i.e., the safety distance, or even a rear-end collision. The driver is then forced to actively intervene and trigger a greater braking effect. This problem arises particularly when the controlled variables for the automatic ranging system are set to a relatively large standard setpoint trailing distance $s_n$ and to low values for reliable normal accelerations $a_n$.

Such a method is described in European Published Patent Application No. 0 846 587, in which the distances to an object detected in front of the motor vehicle is detected by a distance sensor and is supplied to a control device, which forms one or more controlled variables at least as a function of a setpoint distance from a detected object determined at least from the instantaneous driving speed and/or of a predefined setpoint speed to adjust the driving speed of the motor vehicle.

Furthermore, a control device for maintaining a safety distance for a motor vehicle is described in U.S. Pat. No. 5,165,497 that sets the safety distance between the motor vehicle and the preceding motor vehicle in a speed range of 0 to 120 km/h in order to prevent a collision. The control performed by the control device goes so far that when the preceding vehicle stops, the vehicle is decelerated to a standstill. If the preceding vehicle then starts again, the vehicle also starts again. Consequently, there is a coupling between the vehicles, significant acceleration changes resulting in less comfortable handling properties being able to occur.

It is an object of the present invention to improve the functioning method of the method of this type as well as of the corresponding device and to facilitate more operator-friendly handling properties during the docking operation between two motor vehicles.

SUMMARY

The above and other beneficial objects of the present invention are achieved by providing a method and device as described herein.

In a method according to the present invention, the value of a limiting acceleration $a_g$ is calculated for a deceleration of the vehicle as a function of the difference between a predefined setpoint limiting trailing distance $s_g$ and distance $s_{actual}$ and relative velocity $V_{rel}$, the value of the two values of normal acceleration $a_n$ and of limiting acceleration $a_g$ having the greater magnitude is determined as braking acceleration $a_b$ to be used, and the vehicle is decelerated using a braking acceleration $a_b$. In this context, limiting acceleration $a_g$ and setpoint limiting trailing distance $s_g$ represent parameters that for automatic ranging are at a setpoint trailing distance at the bottom limit or at an acceleration values to be used at the top limit for automatic ranging. The smallest setpoint trailing distance or safety distance corresponds to a trailing time of about 0.9 seconds, i.e., at every speed, the vehicle is to follow the preceding vehicle at a time interval of at least 0.9 seconds. However, the terms normal acceleration $a_n$ and standard setpoint trailing distance $s_n$ represent parameters deviating from the previously described limiting values and corresponding to an automatic ranging system having a greater safety distance and lower maximum acceleration values.

It is recognized that the above described problematic driving situation in which the relative velocity of the two motor vehicles is not sufficient for the set "normal" automatic ranging is able to be at least partially detected in that limiting acceleration $a_g$ is calculated in parallel with normal acceleration $a_n$ and in that limiting acceleration $a_g$ is used when a deceleration of the motor vehicle at normal acceleration $a_n$ is not sufficient for docking the vehicle. In this context, the driver of the motor vehicle is not prevented in every case from intervening. However, more significant braking than for normal automatic distance ranging increases the range of driving situations that are able to be controlled by the automatic distance ranging system in a comfortable manner without the intervention of the driver.

The magnitude of normal acceleration $a_n$ and/or of limiting acceleration $a_g$ may increase as relative velocity $V_{rel}$ increases or as distance $s_{actual}$ decreases. This means that when relative velocity $V_{rel}$ is large, the automatic ranging system generates greater acceleration values than is the case for smaller values of relative velocity $V_{rel}$. The same is true for the situation in which distance $s_{actual}$ between both motor vehicles is small. If in this context the value of limiting acceleration $a_g$ increases more significantly than the value of normal acceleration $a_n$, the method according to the present invention begins at or above the parameters relative velocity $V_{rel}$ and distance $s_{actual}$ as limiting acceleration $a_g$ is greater than normal acceleration $a_n$.

Normal acceleration $a_n$ may be calculated with the help of a proportionality controller using a characteristics map using two input variables, e.g., relative velocity $V_{rel}$ and the difference between standard setpoint trailing distance $s_n$ and actual distance $s_{actual}$. Limiting acceleration $a_g$ may be calculated with the help of a proportionality controller using a characteristics map using two input variables, e.g., relative velocity $V_{rel}$ and the difference between setpoint limiting trailing distance $s_g$ and actual distance $s_{actual}$. A more precise mathematical description of an example embodiment is explained in the following on the basis of the description of the drawing.

Standard setpoint trailing distance $s_n$ may be calculated from speed v of the motor vehicle and a predefined standard trailing time $t_n$. Setpoint limiting trailing distance $s_g$ may also be calculated from speed v of the motor vehicle and a predefined limiting trailing time $t_g$. Limiting trailing time $t_g$ described above may have a value of about 0.9 seconds. In comparison, typical values for standard trailing time $t_n$ are in the range of 0.9 to 4.0 seconds, e.g., up to 2.0 seconds. Since an adjustment of the trailing time by the driver is intuitive, this refinement of the adjustment of the trailing distance is often used with the help of a trailing time.

The time characteristic of braking acceleration $a_b$ of the motor vehicle may be constant during the transition between normal acceleration $a_n$ and limiting acceleration $a_g$, i.e., there may be no abrupt change between the two acceleration values. This further increases the comfort of the automatic ranging system since there is no jolt in the movement of the vehicle.

The foregoing object may be achieved in accordance with the present invention by providing a device as described herein. This device is explained below in detail, with reference to an example, reference being made to the Figures.

DETAILED DESCRIPTION

Figure 1:
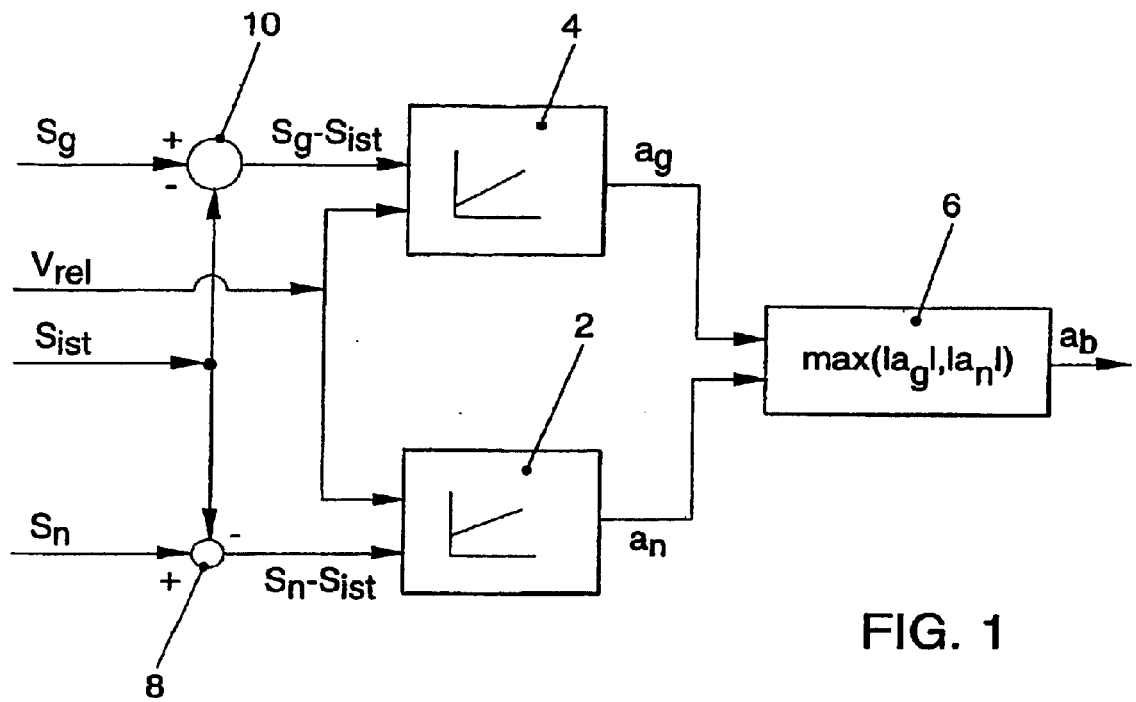
FIG. 1 is a block diagram of an example embodiment of a device according to the present invention.

FIG. 1 illustrates a device according to the present for implementing a method for regulating the speed of a motor vehicle and the distance of the motor vehicle from at least one motor vehicle driving ahead during a docking operation, the motor vehicle having a greater speed v than the preceding motor vehicle. The device has a detection device having at least one distance sensor for determining at least speed v of the motor vehicle, relative velocity $V_{rel}$, and distance $s_{actual}$ from the preceding vehicle. The device also has an evaluation unit that is partially illustrated in FIG. 1. In addition, FIG. 1 illustrates a first proportionality controller 2, which uses a characteristics map to calculate a normal acceleration $a_n$ using two input variables. The two input variables are relative velocity $V_{rel}$ and the difference between standard setpoint trailing distance $s_n$ and actual distance $s_{actual}$. The proportionality controller uses the two input variables to calculate the corresponding value of normal acceleration $a_n$ and outputs it.

The evaluation unit illustrated in FIG. 1 also has a second proportionality controller 4 having a characteristics map for calculating a limiting acceleration $a_g$ that also uses two input variables. They are relative velocity $V_{rel}$ and the difference between setpoint limiting trailing distance $s_g$ and actual distance $s_{actual}$. With the help of these two input variables, proportionality controller 4 calculates the corresponding value of limiting acceleration $a_g$ and outputs it as an output variable.

Furthermore, the evaluation unit has a comparing element 6 for determining the value of the two values of normal acceleration $a_n$ and limiting acceleration $a_g$ having a greater magnitude, the greater of the two values being output as an output variable as braking acceleration $a_b$. This value is then assumed by the engine and brake management in order to deceleration the vehicle.

Typical electronic differential elements 8 and 10 are provided for forming the differences between standard setpoint trailing distance $s_n$ and setpoint limiting trailing distance $s_g$, respectively, and actual distance $s_{actual}$.

Figure 2:
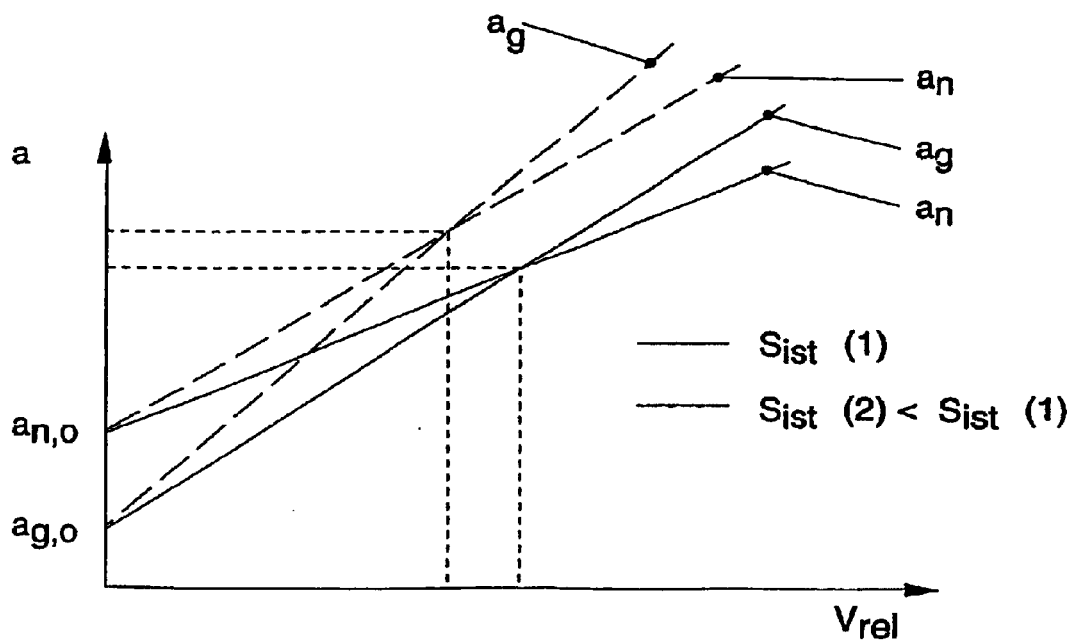
FIG. 2 is a graph of the functional characteristics of normal acceleration $a_n$ and of limiting acceleration $a_g$ for two different distances $s_{actual}(1)$ and $s_{actual}(2)$ between the two motor vehicles.

On the basis of in each case two functional characteristics, FIG. 2 illustrates normal acceleration an and limiting acceleration $a_g$ for two different actual distances $s_{actual}(1)$ and $s_{actual}(2)$.

Both functions are linear functions that are calculated in accordance with the formula for normal acceleration $a_n$ using $$a_n = a_{n,0} + a_{n,1} \cdot \frac{v_{rel}}{s_n - s_{ist}} \text{ for } s_n - s_{ist} > \Delta s_0 \text{ and}$$

$$a_n = a_{n,\max} \text{ for } s_n - s_{ist} \leq \Delta s_0.$$

as well as for limiting acceleration $a_g$ using $$a_g = a_{g,0} + a_{n,1} \cdot \frac{v_{rel}}{s_g - s_{ist}} \text{ for } s_g - s_{ist} > \Delta s_1 \text{ and}$$

$$a_g = a_{g,\max} \text{ for } s_g - s_{ist} \leq \Delta s_1.$$

Therefore, they are essentially linear functional characteristics having different offsets $a_{n,0}$ and $a_{g,0}$ as well as linear slopes $a_{n,1}$ and $a_{g,1}$. The use of the values $\Delta s_0$ and $\Delta s_1$ for purposes of differentiating results in a maximum value being used in each case for normal acceleration $a_n$ and limiting acceleration $a_g$ when the difference between standard setpoint trailing distance $s_n$ or setpoint limiting trailing distance $s_g$ and actual distance $s_{actual}$ tends to zero.

It also apparent from the formulas that the values of normal acceleration $a_n$ and limiting acceleration $a_g$ increase as relative velocity $V_{rel}$ increases and the distance decreases for values above standard setpoint following distance $s_n$ or setpoint limiting trailing distance $s_g$. The indicated formulas are only an example embodiment representing the relationships between the parameters. Other functional characteristics, e.g., non-linear functions, may be used.

Both proportionality controllers 2 and 4 use characteristic maps that each use two input variables as described above. The characteristic maps are made up of a plurality of curves that are exemplarily and sectionally illustrated for two different distances $s_{actual}$ in FIG. 2 and are consequently characterized. If one first considers for a first distance. $s_{actual}(1)$ the characteristic of the two values for normal acceleration $a_n$ and limiting acceleration $a_g$ as a function of relative velocity $V_{rel}$, both lines intersect at a point that is characterized in the coordinate system illustrated in FIG. 2 by dotted lines. If relative velocity $V_{rel}$ is less than the value of the relative velocity for the intersection, the value of normal acceleration an is used as the greater of the two acceleration values. Limiting acceleration $a_g$ is used for relative velocities $V_{rel}$ above the value of the relative velocity characterizing the intersection.

In comparison, the two lines for the values of accelerations $a_n$ and $a_g$ are illustrated for a second distance $s_{actual}(2)$ that is less than distance $s_{actual}(1)$. Since the distance between the two motor vehicles in this situation is smaller, a greater braking effect may be attained in total in order to prevent setpoint limiting trailing distance $s_g$ from not being met. Therefore, the dotted lines are above the solid lines illustrated in FIG. 2. The intersection between the two dotted lines is present at lower relative speeds as well as at a greater value for acceleration a. Consequently, limiting acceleration $a_g$ is rather used for smaller distance $s_{actual}(2)$ than is the case for first greater distance $s_{actual}(1)$. Therefore, the result is that the motor vehicle is more significantly decelerated in the case of smaller distance $s_{actual}(2)$ than in the case of greater distance $s_{actual}(1)$.

What is claimed is:

1. A method for regulating a speed of a first motor vehicle and a distance of the first motor vehicle from at least one second vehicle driving ahead during a docking operation, the first motor vehicle having a greater driving speed than the second vehicle, comprising the steps of:

determining the speed of the first motor vehicle, a relative velocity and a distance from the second vehicle using a detection device that includes a distance sensor;

calculating a value of a normal acceleration for a deceleration of the first motor vehicle as a function of a difference between a predefined standard setpoint trailing distance and the distance and the relative velocity;

determining a value of a limiting acceleration for a deceleration of the first motor vehicle as a function of a difference between a predefined setpoint limiting trailing distance and the distance and the relative velocity;

determining a value of the normal acceleration and the limiting acceleration having a greater magnitude as a braking acceleration to be used; and decelerating the first motor vehicle at the braking acceleration.

2. The method according to claim 1, wherein a magnitude of at least one of the normal acceleration and the limiting acceleration increases as the relative velocity increases.

3. The method according to claim 1, wherein a magnitude of at least one of the normal acceleration and the limiting acceleration increases as the distance increases.

4. The method according to claim 1, wherein the value of the normal acceleration is calculated in the normal acceleration calculating step in accordance with a proportionality controller using a characteristic map using two input variables.

5. The method according to claim 1, further comprising the step of calculating the standard setpoint trailing distance from the speed of the first motor vehicle and a predefined standard trailing time.

6. The method according to claim 1, further comprising the step of calculating the setpoint limiting trailing distance from the speed of the first motor vehicle and a predefined limiting trailing time.

7. The method according to claim 1, wherein a time characteristic of the braking acceleration of the first motor vehicle is constant during a transition between the normal acceleration and the limiting acceleration.

8. A method for regulating a speed of a first motor vehicle and a distance of the first motor vehicle from at least one second vehicle driving ahead during a docking operation, the first motor vehicle having a greater driving speed than the second vehicle, comprising the steps of:

determining the speed of the first motor vehicle, a relative velocity and a distance from the second vehicle using a detection device that includes a distance sensor;

calculating a value of a normal acceleration for a deceleration of the first motor vehicle as a function of a difference between a predefined standard setpoint trailing distance and the distance and the relative velocity;

determining a value of a limiting acceleration for a deceleration of the first motor vehicle as a function of a difference between a predefined setpoint limiting trailing distance and the distance and the relative velocity;

determining a value of the normal acceleration and the limiting acceleration having a greater magnitude as a braking acceleration to be used; and decelerating the first motor vehicle at the braking acceleration;

wherein the value of the normal acceleration is calculated in the normal acceleration calculating step in accordance with a proportionality controller using a characteristic map using two input variables; and wherein the value of the normal acceleration is calculated in the normal acceleration calculating step as:

$$a_n = a_{n,0} + a_{n,1} \cdot \frac{v_{rel}}{s_n - s_{ist}} \text{ for } s_n - s_{ist} > \Delta s_0 \text{ and}$$

$$a_n = a_{n,max} \text{ for } s_n - s_{ist} \leq \Delta s_0;$$

wherein $a_n$ represents the normal acceleration;
wherein $V_{rel}$ represents the relative velocity;
wherein $s_n$ represents the predefined standard setpoint trailing distance; and
wherein $s_{ist}$ represents the distance.

9. The method according to claim 8, wherein the value of the limiting acceleration is determined in the limiting acceleration determining step in accordance with a proportionality controller using a characteristic map using two input variables.

10. The method according to claim 9, wherein the value of the limiting acceleration is determined as:

$$a_g = a_{g,0} + a_{n,1} \cdot \frac{v_{rel}}{s_g - s_{ist}} \text{ for } s_g - s_{ist} > \Delta s_1 \text{ and}$$

$$a_g = a_{g,max} \text{ for } s_g - s_{ist} \leq \Delta s_1;$$

wherein $a_g$ represents the limiting acceleration;
wherein $v_{rel}$ represents the relative velocity;
wherein $s_g$ represents the predefined setpoint limiting trailing distance; and
wherein $s_{ist}$ represents the distance.

11. The method according to claim 10, wherein $a_{n,0}$ is greater than $a_{g,0}$.

12. The method according to claim 10, wherein $a_{n,1}$ is less than $a_{g,1}$.

13. A device configured to implement a method for regulating a speed of a first motor vehicle and a distance of the first motor vehicle from at least one second vehicle driving ahead during a docking operation, the first motor vehicle having a greater driving speed than the second vehicle, comprising:

a detection device including at least one distance sensor configured to determine at least the speed of the first motor vehicle, a relative velocity and a distance from the second vehicle; and an evaluation unit including a first proportionality controller including a characteristics map configured to calculate a normal acceleration using two input variables, the evaluation unit including a second proportionality controller including a characteristics map configured to calculate a limiting acceleration using two input variables, the evaluation unit including a comparing element configured to determine a value of the normal acceleration and the limiting acceleration having a greater magnitude.

14. The device according to claim 13, wherein the evaluation unit is configured to output the greater of the normal acceleration and the limiting acceleration as a value of the braking acceleration.

15. A device for regulating a speed of a first motor vehicle and a distance of the first motor vehicle from at least one second vehicle driving ahead during a docking operation, the first motor vehicle having a greater driving speed than the second vehicle, comprising:

means for determining the speed of the first motor vehicle, a relative velocity and a distance from the second vehicle using detecting means that includes distance sensing means;

means for calculating a value of a normal acceleration for a deceleration of the first motor vehicle as a function of a difference between a predefined standard setpoint trailing distance and the distance and the relative velocity;

means for determining a value of a limiting acceleration for a deceleration of the first motor vehicle as a function of a difference between a predefined setpoint limiting trailing distance and the distance and the relative velocity;

means for determining a value of the normal acceleration and the limiting acceleration having a greater magnitude as a braking acceleration to be used; and means for decelerating the first motor vehicle at the braking acceleration.

* * * * *